March 10, 1970 W. E. JOHNSON 3,499,397
PALLET
Filed May 20, 1968 2 Sheets-Sheet 1

INVENTOR
Walter E. Johnson
BY Russell Foster
ATTORNEY

March 10, 1970 W. E. JOHNSON 3,499,397
PALLET
Filed May 20, 1968 2 Sheets-Sheet 2

INVENTOR
Walter E. Johnson
BY *T. Russell Foster*
ATTORNEY

United States Patent Office 3,499,397
Patented Mar. 10, 1970

3,499,397
PALLET
Walter E. Johnson, Hartsville, S.C., assignor to Sonoco Products Company, Hartsville, S.C., a corporation of South Carolina
Filed May 20, 1968, Ser. No. 730,417
Int. Cl. B65d 19/24
U.S. Cl. 108—51            6 Claims

ABSTRACT OF THE DISCLOSURE

A pallet having a body having a one-piece body of foam plastic material the bottom surface of which is provided with a pair of channels for accommodating the lifting forks of a vehicle and the upper surface of which is provided with slots centrally overlying the channels and having reinforcing members positioned therein to distribute the lifting force extended on the pallet by the forks.

---

This invention relates to a pallet and more particularly to a reinforced pallet of foam plastic material.

Load carrying pallets of the type arranged to be manipulated by the tines or forks of a lift vehicle of the well known commercial type commonly referred to as a "fork-truck" have in the past generally been fabricated from wood and even heavy paperboard. The use of such relatively expensive materials for such pallets as well as costs of fabricating such pallets result in a relatively high initial cost. Since such pallets are subjected to severe destructive forces during use, considerable loss is incurred when the pallet is damaged.

In order to reduce the initial cost of such pallets, efforts have been made to utilize low cost plastic materials and conventional plastic molding techniques in use today. As is well known, the load carrying capacity of pallets must be relatively high, a requirement not readily met by the use of plastic materials. In addition, the many destructive forces to which such pallets are subjected such as sharp blows, the supporting of the loaded pallet on relatively narrow forks, etc., further require that pallets in general use today be of rugged construction. Therefore, where plastics have been used in pallet construction, it has been necessary to use a sturdy pallet construction requiring substantial amounts of relatively expensive plastic material in order to provide the necessary strength and durability for such pallets and to permit the pallet to be lifted without undue deformation.

Accordingly, a primary object of this invention is to provide a new and novel pallet of plastic material.

Another object of this invention is to provide a new and novel lightweight pallet formed from inexpensive plastic foam material.

A further object of this invention is to provide a new and novel pallet which may be molded in a one-piece construction from plastic foam material to provide a pallet which is both lightweight and rugged in construction so as to provide a high degree of resistance to damage and undue deformation during use.

This invention further contemplates the provision of a new and novel pallet which may be molded by conventional techniques in a one-piece construction from inexpensive plastic foam material and which utilizes a novel arrangement of members for distributing the upward force of a fork-truck when supported in the loaded condition on the forks.

Other objects and advantages of the invention will become apparent from the following description taken in connection with the accompanying drawing.

In general, the objects of this invention are accomplished by the provision of a pallet having a one-piece body of expanded plastic foam material for association with a lift vehicle having a pair of lifting forks. The body includes an upper surface, a pair of sidewalls, a pair of end walls, and a bottom surface in which is provided a pair of transversely extending channels arranged in substantially parallel, spaced apart relationship. The channels are provided with a bottom wall and ends opening in at least one of the body sidewalls for receiving the pair of lifting forks. The upper surface of the body is provided with at least one slot positioned in centrally arranged, overlying relationship with each of the channels and a reinforcing member is positioned within each slot for distributing the upward force of the forks received within the channels exerted on the body during the lifting of the body under load.

The novel features which are believed to be characteristic of the invention are set forth with particularity with the appended claims. The invention itself, however, both as to its organization and method of operation may be best understood by reference to the following description taken in conjunction with the accompanying drawings in which:

Figure 3:
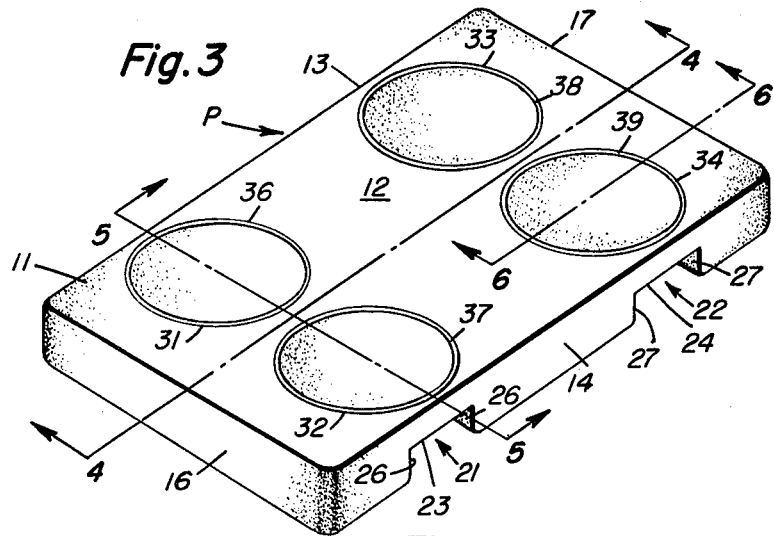
FIGURE 3 is a prospective view of the pallet of the invention.

Referring now to the drawings and to FIGURE 3 in particular there is shown a pallet construction in accordance with the invention which is designated generally by the letter P. As will be explained hereinafter, the pallet P is arranged for association with a lift vehicle (not shown) commonly referred to as a "fork-truck" having a pair of lifting tines or forks.

Figure 1:
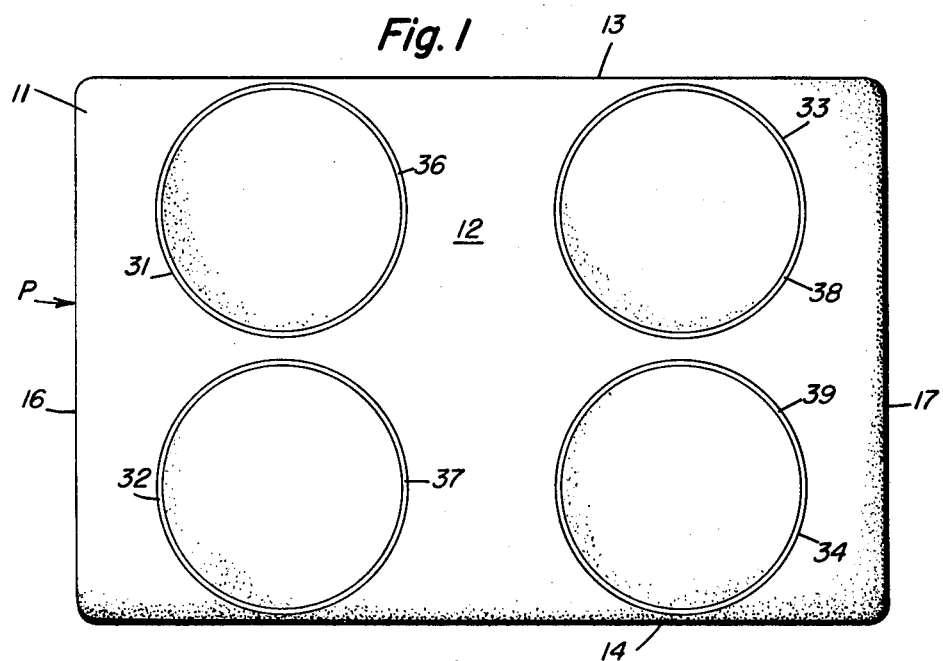
FIGURE 1 is a plan view of the pallet of the invention.
Figure 2:
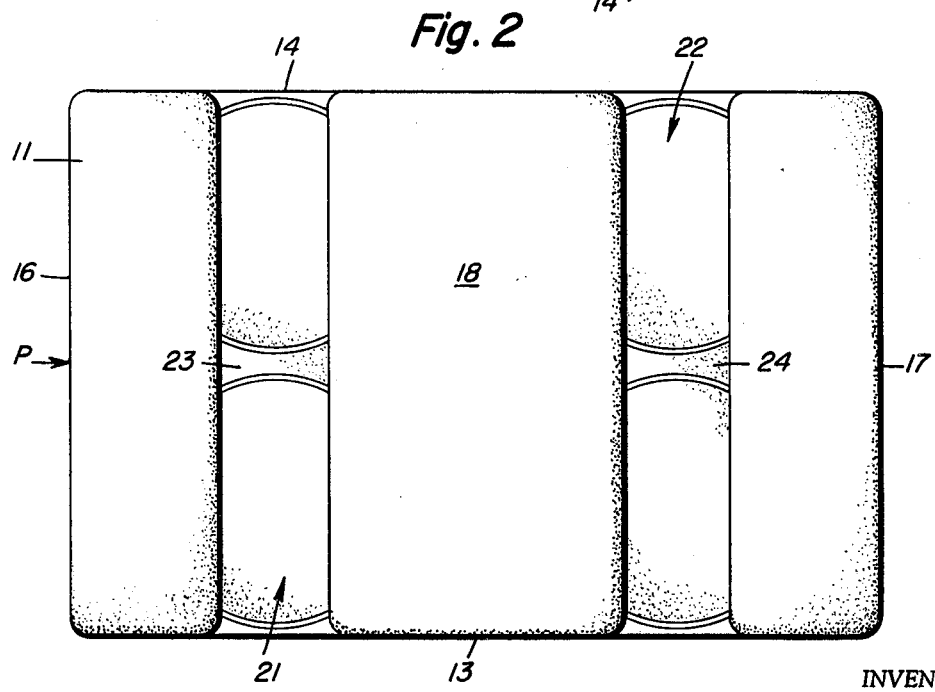
FIGURE 2 is a bottom view of the pallet of FIGURE 1.

As shown best in FIGURES 1–3, the pallet P includes a one-piece body 11 which is molded by any well known molding technique from plastic foam material. By way of example, the body 11 is formed by expanding granules or beads of plastic material such as polystyrene in the well known manner in a suitable mold to produce an expanded plastic foam body 11. It should be understood that suitable reinforcing materials such as fibers, etc. may be added to the foam plastic from which the body 11 is formed for additional strength.

Figure 4:
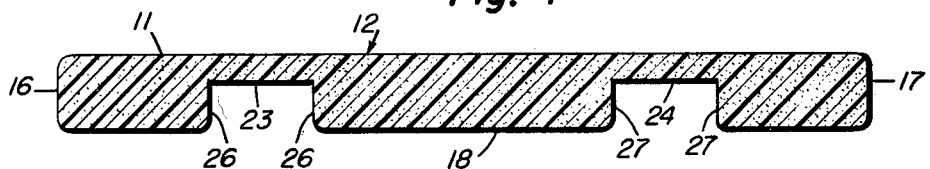
FIGURE 4 is a sectional view taken substantially along line 4—4 of FIGURE 3 in the direction of the arrows.
Figure 5:
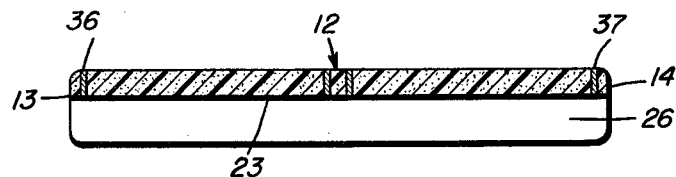
FIGURE 5 is a sectional view taken substantially along line 5—5 of FIGURE 3 in the direction of the arrows.

The body 11, which in the preferred embodiment is of substantially rectangular configuration, includes upper surface 12, a pair of side walls 13, 14, a pair of end walls 16, 17, and a bottom surface 18 as shown best in FIGURE 2. The body bottom surface 18 is provided with a pair of transversely extending channels 21, 22, preferably of inverted U-shaped cross-sectional shape and arranged in substantially parallel, spaced apart relationship adjacent the end walls 16, 17 as shown in FIGURES 4, 5.

The channels 21, 22 include bottom walls 23, 24 and side walls 26, 27 respectively and have ends opening into at least one of the body sidewalls such as side wall 14 for receiving the pair of lifting forks of the associated vehicle in the well known manner. In the preferred embodiment, the channels 21, 22 extend throughout the body 11 with ends opening into both of the body sidewalls 13, 14 as shown best in FIGURE 2.

The upper surface 12 of the body 11 is provided with at least one slot positioned in centrally arranged, overlying relationship with each of the channels 21, 22. More specifically, a pair of slots 31, 32 are arranged in transversely extending, spaced apart relationship overlying channel 21 and a pair of slots 33, 34 are similarly arranged in transversely extending, spaced apart relationship overlying channel 22 as shown in FIGURES 1, 3. Each of the slots 31–34 is preferably continuous and, in the illustrated embodiment is of annular shape.

Figure 6:
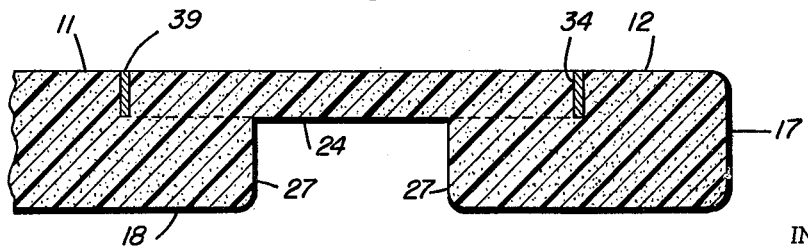
FIGURE 6 is a sectional view taken substantially along line 6—6 of FIGURE 3 in the direction of the arrows.

It can be seen that each pair of slots 31, 32, and 33, 34, being centrally arranged relative to the channels 21, 22 respectively are therefore positioned adjacent the body end walls 16, 17 as shown. In the preferred embodiment, the slots 31–34 extend into the body 11 from the body upper surface 12 to a depth such that the bottom walls 31a–34a of the slots 31–34 respectively lie substantially co-planar with the bottom walls 23, 24 of the channels 21, 22 as shown best in FIGURES 5, 6.

It should be understood that the slots 31–34 may be of any suitable configuration and are arranged to receive reinforcing members 36–39 for distributing the upward force of the associated lifting forks received within the channels 21, 22 exerted on the body 11 when loaded thereby preventing damage to or undue deformation of the body 11. As the slots 31–34 are of annular configuration in the illustrated embodiment, the reinforcing members 36–39 are similarly of annular shape so as to be snugly accommodated or nested within each of the slots 31–34 respectively with the upper edges of the reinforcing members 36–39 preferably flush with the body upper surface 12. The annular reinforcing members 36–39 may be formed of any suitable material such as paper, plastic, or the like and, by way of example, the reinforcing members may be formed by severing a paper tube such as a spirally wound paper tube into relatively short longitudinal sections having a length corresponding to the depth of the slots 31–34.

In the use of the pallet P of the invention, a load of any suitable type is positioned in the usual manner along the body upper surface 12. When the pallet and load supported thereon are to be transported, the forks of the fork truck are inserted within the channels 21, 22 in the usual manner with the pallet being positioned on a supporting surface such as a floor. As is well known, the lifting movement of the forks exerts an upward force as indicated by the arrows I in FIGURE 4, on the bottom walls 23, 24 of the channels 21, 22 respectively and the loaded pallet may be moved to the desired location. The lightweight, relatively fragile nature of plastic foam material, if used alone to form the body 11, would not permit normal functioning of the pallet without some damage but with the addition of the reinforcing members 36–39 so that the upward force of the forks is distributed throughout a wide portion of the pallet body adjacent the channels 21, 22, undue deformation of the pallet body is prevented and the pallet may be used in the above described manner with no damage to the pallet P from such lifting forces encountered during use.

It can be seen that there has been provided with a novel construction of the invention, a pallet which not only may be formed from inexpensive, lightweight material in a one-piece construction, but which is capable of supporting relatively large loads without undue deformation and without sustaining destructive damage from the lifting forces of the forks of a lift vehicle with which such pallets are associated. Not only is the plastic foam material from which the body of the pallet of the invention is constructed relatively inexpensive but the body may be formed in a single conventional molding operation so that its initial cost is low whereby the pallet may even be considered expendible. By the novel arrangement of the reinforcing members, which in themselves may be manufactured at a very low cost from readily available materials such as paper tubes, the pallet is able to withstand substantial lifting forces without materially adding to the weight of the pallet. Furthermore, reinforcing members may be readily positioned within the slots provided in the pallet as the snug fitting relationship between the reinforcing members and the pallet slots maintain the reinforcing members within the slots during use eliminating the need for adhesives or the like. At the same time, the damage usually sustained by present day pallets constructed from relatively hard material such as metal, wood, or the like is minimized due to the resilient nature of the plastic foam material from which the pallet of the present invention is formed.

While there has been described what at present is considered to be the preferred embodiment of the invention, it will be understood by those skilled in the art that various changes and modifications may be made therein without departing from the invention.

Having thus described the invention, what is claimed is:

1. A pallet for association with a lift vehicle having a pair of lifting forks comprising, in combination, a one-piece body of expanded foam plastic material having an upper surface, a pair of sidewalls, a pair of end walls and a bottom surface, said bottom surface having a pair of transversely extending channels therein arranged in substantially parallel, spaced apart relationship, said channels having a bottom wall and ends opening into at least one of said sidewalls for receiving said pair of lifting forks, said upper surface having at least one slot positioned in centrally arranged, overlying relationship with each of said channels, a reinforcing member positioned within each of said slots for distributing the upward forces of said lifting forks throughout a major portion of the pallet body thereby preventing damage and undue deformation to said pallet during use.

2. A pallet in accordance with claim 1 wherein each of said slots and said reinforcing members are continuous.

3. A pallet in accordance with claim 2 wherein said slots and reinforcing members are of annular configuration.

4. A pallet in accordance with claim 1 wherein the bottom wall of said slots is arranged in co-planar relationship with the bottom wall of said channels.

5. A pallet in accordance with claim 1 wherein a pair of said slots are provided in overlying relationship with each of said channels, said slots in each of said pairs being positioned in transversely extending, spaced apart relationship along the axis of said channels.

6. A pallet in accordance with claim 5 wherein said slots and said reinforcing members are of annular configuration.

References Cited

UNITED STATES PATENTS

| | | | |
|---|---|---|---|
| 3,159,115 | 12/1964 | Nolan | 108—51 |
| 3,307,504 | 3/1967 | Cloyd et al. | 108—58 |
| 3,331,336 | 7/1967 | Schulde et al. | 108—57 |
| 3,380,403 | 4/1968 | Sullivan | 108—51 |
| 3,405,666 | 10/1968 | Miller | 108—58 |

BOBBY R. GAY, Primary Examiner

GLENN O. FINCH, Assistant Examiner